US008748547B2

(12) United States Patent
Park et al.

(10) Patent No.: US 8,748,547 B2
(45) Date of Patent: *Jun. 10, 2014

(54) ETHYLENE α-OLEFIN COPOLYMER (75) Inventors: Dong-Kyu Park, Daejeon (KR); Byung-Kwon Lim, Daejeon (KR); Jong-Joo Ha, Daejeon (KR); Don-Ho Kum, Daejeon (KR); Yang-Kee Kim, Daejeon (KR); Choong-Hoon Lee, Daejeon (KR); Seung-Whan Jung, Suwon-si (KR)

(73) Assignee: LG Chem, Ltd., Seoul (KR)

( * ) Notice: Subject to any disclaimer, the term of this patent is extended or adjusted under 35 U.S.C. 154(b) by 82 days.

This patent is subject to a terminal disclaimer.

(21) Appl. No.: 12/451,226

(22) PCT Filed: May 7, 2008

(86) PCT No.: PCT/KR2008/002549
§ 371 (c)(1),
(2), (4) Date: Nov. 2, 2009

(87) PCT Pub. No.: WO2008/140205
PCT Pub. Date: Nov. 20, 2008

(65) Prior Publication Data
US 2010/0087609 A1 Apr. 8, 2010

(30) Foreign Application Priority Data
May 9, 2007 (KR) .................. 10-2007-0045179

(51) Int. Cl.
*C08F 4/76* (2006.01)
*C08F 4/64* (2006.01)
*C08F 4/52* (2006.01)
*C08F 210/16* (2006.01)
*C08F 210/14* (2006.01)

(52) U.S. Cl.
USPC ........... 526/172; 526/160; 526/161; 526/170; 526/348; 526/348.2

(58) Field of Classification Search
USPC .................... 526/172, 161, 348, 348.5, 348.2
See application file for complete search history.

(56) References Cited

U.S. PATENT DOCUMENTS

| | | | |
|---|---|---|---|
| 5,064,802 A | 11/1991 | Stevens et al. | |
| 5,106,926 A | 4/1992 | Eisinger et al. | |
| 5,682,128 A * | 10/1997 | Huang | 335/216 |
| 6,500,223 B1 * | 12/2002 | Sakai et al. | 71/64.07 |
| 6,548,686 B2 | 4/2003 | Nabika et al. | |
| 7,972,987 B2 * | 7/2011 | Lee et al. | 502/155 |

FOREIGN PATENT DOCUMENTS

| | | | | |
|---|---|---|---|---|
| CN | 1121730 A | 5/1996 | | |
| CN | 1235983 A | 11/1999 | | |
| CN | 1258681 A | 7/2000 | | |
| CN | 1636024 A | 7/2005 | | |
| JP | 06-508396 | 9/1994 | | |
| JP | 07-002943 | 1/1995 | | |
| JP | 07-033825 | 2/1995 | | |
| JP | 9-57916 A | 3/1997 | | |
| JP | 9-58189 A * | 3/1997 | | B43L 3/00 |
| JP | 10-087718 | 4/1998 | | |
| JP | 2000-38409 A | 2/2000 | | |
| JP | 2003-40933 A | 2/2003 | | |
| JP | 2006307176 A | 11/2006 | | |
| JP | 2008-527050 | 7/2008 | | |
| JP | 2010-519199 | 6/2010 | | |
| WO | WO 93/19107 | 9/1993 | | |
| WO | 9965957 A1 | 12/1999 | | |
| WO | WO 01/98409 A1 * | 12/2001 | | C08L 23/16 |
| WO | WO 2004/039852 A1 * | 5/2004 | | C08F 210/06 |
| WO | WO 2007/034920 A1 | 3/2007 | | |
| WO | WO 2007/111423 | 10/2007 | | |
| WO | WO 2008/100064 | 8/2008 | | |

OTHER PUBLICATIONS

Cho et al., Organometallics, 2006, 25, 2133-2134.*
JP 9-58189 A (Mar. 1997) Usami, Katsuyuki, abstract and translation in English.*
Cho et al., "*o*-Phenylene-Bridged Cp/Amido Titanium Complexes for Ethylene/1-Hexene Copolymerizations", Organometallics, 25(9), Apr. 2006, pp. 2133-2134.
Enders et al., "Chirale Titan- und Zirkoniumkomplexe mit dem 1-(8-Chinolyl)-2,3-dimethylcyclopentadienyl-Liganden", Journal of Organometallic Chemistry, Dec. 1997, pp. 251-256.
Enders et al., "Synthesis of Main Group and Transition Metal Complexes with the (8-Quinolyl) cyclopentadienyl Ligand and Their Application in the Polymerization of Ethylene", Organometallics, 23(16), Aug. 2004, pp. 3832-3839.
Gibson et al., "Advances in Non-Metallocene Olefin Polymerization Catalysis", Chem. Rev., 2003, pp. 283-315.
Chen et al., "A Novel Phenolate 'Constrained Geometry' Catalyst System. Efficient Synthesis, Structural Characterization, and α-Olefin Polymerization Catalysis", Organometallics, 1997, pp. 5958-5963.
Zhang et al., "Constrained Geometry Tetramethylcyclopentadienyl-phenoxytitanium Dichlorides: Template Synthesis, Structures, and Catalytic Properties for Ethylene Polymerization", Organometallics, 2004, pp. 540-546.

(Continued)

*Primary Examiner* — Rip A. Lee
(74) *Attorney, Agent, or Firm* — McKenna Long & Aldridge LLP (57) ABSTRACT

The present invention relates to an ethylene α-olefin copolymer having a narrower molecular weight distribution, and a uniform distribution of comonomer. The ethylene α-olefin copolymer according to the present invention has a uniform comonomer distribution and exhibits a lower density in the same comonomer content, unlike conventional ethylene copolymers having a random or blocky comonomer distribution.

6 Claims, 1 Drawing Sheet

(56) References Cited

OTHER PUBLICATIONS

Turner et al., "Facile resolution of constrained geometry indenyl-phenoxide litigation", Journal of The Royal Society of Chemistry, Chem. Communication, 2003, pp. 1034-1035.

Christie et al., "Novel Routes to Bidentate Cyclopentadienyl-Alkoxide Complexes of Titanium: Synthesis of ($\eta^5$-$\sigma$-$C_5R^1_4CHR^2CH_2CR^3R^4O$)$TiCl_2$" Organometallics, 1999, pp. 348-359.

Gielens et al., "Titanium Hydrocarbyl Complexes with a Linked Cyclopentadienyl-Alkoxide Ancillary Ligand; Participation of the Ligand in an Unusual Activation of a (Trimethylsilyl) methyl Group", Organometallics, 1998, pp. 1652-1654.

Rau et al., "Synthesis and application in high-pressure polymerization of a titanium complex with a linked cyclopentadienyl-phenoxide ligand", Journal of Organometallic Chemistry, 2000, pp. 71-75.

* cited by examiner

Fig. 1

Dow CGC Ethylene-Octene Copolymers

LG Ethylene-Octene Copolymers

Fig. 2

Dow CGC Ethylene-Octene Copolymers

LG Ethylene-Octene Copolymers

ETHYLENE α-OLEFIN COPOLYMER

This application claims the benefit of PCT/KR2008/002549 filed on May 7, 2008 and Korean Patent Application No. 10-2007-0045179 filed on May 9, 2007, both of which are hereby incorporated herein by reference for all purposes in their entirety.

TECHNICAL FIELD

The present invention relates to an ethylene α-olefin copolymer. In particular, the present invention relates to an ethylene α-olefin copolymer having a narrower molecular weight distribution, a uniform distribution of comonomer which is copolymerized with ethylene, and a low density in the same comonomer content, as compared to known ethylene α-olefin copolymers. This application claims priority benefits from Korean Patent Application No. 10-2007-0045179, filed on May 9, 2007, the entire contents of which are fully incorporated herein by reference.

BACKGROUND ART

The Dow Chemical Company announced [Me$_2$Si(Me$_4$C$_5$)NtBu]TiCl$_2$ (Constrained-Geometry Catalyst, CGC) in the early 1990's (U.S. Granted Pat. No. 5,064,802), wherein in the copolymerization reaction of ethylene and alpha-olefin, excellent characteristics that the CGC has, as compared with per se known metallocene catalysts can be usually classified into the two categories: (1) it produces a high molecular weight polymer with high activity even at a high polymerization temperature, and (2) it yield very excellent copolymerization of an alpha-olefin having high steric hindrance, such as 1-hexene and 1-octene. In addition, upon polymerization reaction, there have been gradually several characteristics of CGC, and thus extensive studies to synthesize a derivative of CGC for use as a polymerization catalyst have been made in the academic and industrial fields.

As one approach, there have been trials for synthesis of, metal compounds to which various bridges and nitrogen substituents instead of silicon bridges are introduced, and polymerization using the same. Some representative examples of recently known metal compounds include the followings (*Chem. Rev.* 2003, 103, 283):

(1)

(2)

(3)

(4)

To the above-listed compounds, a phosphorous bridge (1), an ethylene or propylene bridge (2), a methylidene bridge (3), and a methylene bridge (4) are each introduced, instead of the silicon bridges in the CGC structure. However, when they are used for ethylene polymerization, or copolymerization with an alpha-olefin, they had no excellent results regarding the activity or the copolymerization performances, as compared with CGC.

As another approach, there have been trials for synthesis of many compounds comprising an oxido ligand instead of the amido ligand of the CGC, and sometimes polymerization using the same. Examples thereof are summarized as follows:

(5)

(6)

(7)

(8)

The compound (5) is characterized in that a Cp (Cyclopentadiene) derivative and an oxido ligand are bridged via an ortho-phenylene group, as disclosed by T. J. Marks, et al. (*Organometallics* 1997, 16, 5958). Also, a compound having the same bridge and polymerization using the same are disclosed by Mu, et al. (*Organometallics* 2004, 23, 540). Further, an indenyl ligand and an oxido ligand are bridged via the same ortho-phenylene group, as disclosed by Rothwell, et al. (*Chem. Commun.* 2003, 1034). The compound (6) is characterized in that a cyclopentadienyl ligand and an oxido ligand are bridged through three carbons, as disclosed by Whitby, et al. (*Organometallics* 1999, 18, 348), and these catalysts are reported to exhibit activity on syndiotactic polystyrene polymerization. Further, similar compounds are also reported by Hessen, et al. (*Organometallics* 1998, 17, 1652). The compound (7) is characterized in that it exhibits activity on ethylene and ethylene/1-hexene copolymerization at a high temperature and a high pressure (210° C., 150 MPa), as disclosed by Rau, et al. (*J. Organomet. Chem.* 2000, 608, 71). Further, catalysts such as compound (8) which has similar structure to compound (7) were synthesized and a patent application claiming polymerization at a high temperature and a high pressure using the same were filed by Sumitomo Corp. (U.S. Pat. No. 6,548,686).

However, in spite of the above trials, only few catalysts are substantially in use for commercial plants. Further, most of the copolymers of ethylene and alpha-olefin show a random distribution of comonomers. Recently, extensive studies in the academic and industrial fields have been made to obtain polyolefin copolymer having various composition distribution and characters, and it still requires new catalysts and processes to achieve it.

DISCLOSURE

Technical Problem

The present inventors found that an ethylene α-olefin copolymer with a uniform distribution of α-olefin comonomer within the copolymer and with a low density in the same content of α-olefin comonomer can be obtained by a continuous solution polymerization process using a catalyst composition containing transition metal compounds with a specific quinoline group, as compared to the known ethylene α-olefin copolymers.

Accordingly, it is an object of the present invention to provide an ethylene α-olefin copolymer having a narrow molecular weight distribution, a uniform distribution of α-olefin comonomer in the copolymer, and a low density in the same content of α-olefin comonomer.

Technical Solution

In order to achieve the above object, the present invention provides an olefin copolymer comprising ethylene and $C_3$-$C_{20}$ α-olefin, wherein the olefin copolymer has a) a density (d) defined by Equation: $10^3 \times d \leq -1.8 \times A + 937$ (d is a density of copolymer, and A is a weight percentage of α-olefin in copolymer) and b) a molecular weight distribution (Mw/Mn) of less than 3.5.

The olefin copolymer may be prepared using a catalyst composition containing a transition metal compound of the following Formula 1.

[Formula 1]

wherein R1, R1', R2, R2', R3, R3' and R3" are the same as or different from each other, and are each independently hydrogen; halogen radical; an alkyl having 1 to 20 carbon atoms, aryl or silyl radical; an alkenyl having 2 to 20 carbon atoms, alkylaryl, or arylalkyl radical; a Group 14 metalloid radical substituted with hydrocarbyl; an alkoxy, aryloxy or amino radical, in which two or more thereof may be connected to each other by an alkylidene radical containing an alkyl having 1 to 20 carbon atoms or aryl radical to form an aliphatic or aromatic ring, CY1 is a substituted or unsubstituted aliphatic or aromatic ring, in which CY1 may be substituted with hydrogen; a halogen radical; or an alkyl having 1 to 20 carbon atoms or aryl radical, and in the case where CY1 is substituted with the plural substituents, two or more substituents may be connected to each other to form an aliphatic or aromatic ring;

M is a Group 4 transition metal; and

Q1 and Q2 are the same as or different from each other, and are each independently a halogen radical; an alkyl amido having 1 to 20 carbon atoms or aryl amido radical; alkyl having 1 to 20 carbon atoms, alkenyl, aryl, alkylaryl or arylalkyl; or an alkylidene radical having 1 to 20 carbon atoms.

Advantageous Effects

The ethylene α-olefin copolymer according to the present invention exhibits a low density in the same content of α-olefin comonomer, and a uniform distribution of α-olefin comonomer in the copolymer, thereby having a lower melting point and crystallinity.

BEST MODE

Hereinafter, the present invention will be described in more detail.

The olefin copolymer according to the present invention has a density, defined by Equation: $10^3 \times d \leq -1.8 \times A + 937$ (d is a density of copolymer, and A is a weight percentage of α-olefin in copolymer). The present inventors found that in the case where the relationship between the content and density of α-olefin comonomer of ethylene α-olefin copolymer satisfies the above Equation, the copolymer has a uniform distribution of α-olefin comonomer in the copolymer, and a low density in the same content of α-olefin comonomer, as compared to known ethylene α-olefin copolymers.

In the present invention, the olefin copolymer having a density satisfying the above Equation may be prepared by a catalyst composition containing the transition metal compound of Formula 1.

The transition metal compound of Formula 1 includes the compound of the following Formula 2:

[Formula 2]

wherein R4, R4', R5, R5' and R6 to R14 are the same as or different from each other, and are each independently hydrogen; a halogen radical; an alkyl having 1 to 20 carbon atoms, aryl or silyl radical, an alkenyl having 2 to 20 carbon atoms, alkylaryl, or arylalkyl radical; a Group 14 metalloid radical substituted with hydrocarbyl; or an alkoxy, aryloxy or amino radical, in which two or more thereof are connected to each other by an alkylidene radical containing an alkyl having 1 to 20 carbon atoms or aryl radical to form an aliphatic or aromatic ring, M is a Group 4 transition metal; and Q3 and Q4 are the same as or different from each other, and are each independently a halogen radical; an alkyl amido having 1 to 20 carbon atoms or aryl amido radical; alkyl having 1 to 20 carbon atoms, alkenyl, aryl, alkylaryl or arylalkyl; or an alkylidene radical having 1 to 20 carbon atoms.

More specifically, the compound of Formula 2 comprises a compound of the following Formula 3 or 4.

[Formula 3]

wherein the substituent is the same as defined in Formula 2,

[Formula 4]

wherein R4, R4' and R5' are the same as or different from each other, and are each independently a hydrogen atom or an alkyl having 1 to 20 carbon atoms, aryl or silyl radical;

M is a Group 4 transition metal; and

Q3 and Q4 are the same as or different from each other, and are each independently a halogen radical; an alkyl amido having 1 to 20 carbon atoms or aryl amido radical; of an alkyl radical having 1 to 20 carbon atoms.

The compound of Formula 1 includes transition metal compounds having the following structures as a preferred compound to control the electronic or steric environment around the metal.

wherein R15 and R15' are each independently selected from hydrogen and a methyl radical, and Q5 and Q6 are each independently selected from methyl, dimethylamido and chloride radicals.

The catalyst composition containing the catalyst of Formula 1 may further include one or more of cocatalyst compounds represented by the following Formulae 5 to 7.

$$-[Al(R16)-O]a- \qquad \text{[Formula 5]}$$

wherein R16 is each independently a halogen radical, a hydrocarbyl radical having 1 to 20 carbon atoms, or a hydrocarbyl radical having 1 to 20 carbon atoms which is substituted with halogen, a is an integer of 2 or more;

$$D(R17)_3 \qquad \text{[Formula 6]}$$

wherein D is aluminum or boron;

R17 is each independently a halogen radical, a hydrocarbyl radical having 1 to 20 carbon atoms, or a hydrocarbyl radical having 1 to 20 carbon atoms which is substituted with halogen, $$[L-H]^+[ZA_4]^- \text{ or } [L]^+[ZA_4]^- \qquad \text{[Formula 7]}$$

wherein L is neutral or cationic Lewis acid;

H is a hydrogen atom;

Z is an element of Group 13 including B, Al, Ga, In and Tl; and

A is each independently an aryl having 6 to 20 carbon atoms or alkyl radical, in which one or more hydrogen atoms are substituted with halogen, a hydrocarbyl having 1 to 20 carbon atoms, alkoxy or phenoxy radical.

Among the cocatalyst compounds, the compounds represented by Formula 5 and 6 may be used as an alkylating agent, and the compound represented by Formula 7 may be used as an activating agent.

The catalyst composition exists in the state activated by the reaction of the transition metal compound of Formula 1 with the cocatalysts, which may be referred to as an activated catalyst composition. However, since it is well known in the art that the catalyst composition exists in the activated state, it would not to particularly use the term "activated catalyst composition" in the present specification.

The ethylene-alpha olefin copolymer according to the present invention may be prepared by polymerization of ethylene and alpha olefin using a catalyst composition comprising the compound of Formula 1 and at least one cocatalyst of compounds of Formulae 5 to 7. The catalyst composition may be prepared by the methods for preparing a catalyst composition as follows.

First, the present invention provides a method for preparing the catalyst composition, comprising the steps of: contacting the transition metal compound of Formula 1 and the compound represented by Formula 5 or 6 to obtain a mixture; and adding the compound represented by Formula 7 to the mixture.

Second, the present invention provides a method for preparing the catalyst composition, comprising a step of contacting the transition metal compound represented by Formula 1 and the compound represented by Formula 5.

Third, the present invention provides a method for preparing the catalyst composition, comprising a step of contacting the transition metal compound of Formula 1 and the compound represented by Formula 7.

In the first method of the methods for preparing the catalyst composition, the molar ratio of the compound represented by the formula 5 or 6 to the transition metal compound of the formula 1 is preferably 1:2 to 1:5,000, more preferably 1:10 to 1:1,000, and most preferably 1:20 to 1:500.

Moreover, the molar ratio of the compound represented by the formula 7 to the transition metal compound of the formula 1 is preferably 1:1 to 1:25, more preferably 1:1 to 1:10, and most preferably 1:2 to 1:5.

In the first method for preparing the catalyst composition, the molar ratio of the compound represented by the formula 5 or 6 to the transition metal compound of the formula 1 is more than 1:2, the amount of the alkylating agent is too low, which causes a problem of not completely performing alkylation of the metal compound. If the molar ratio is less than 1:5,000, the metal compound is alkylated but the side reaction between the remaining excessive amount of the alkylating agent and the activating agent of the formula 7 causes a problem of not completely performing activation of the alkylated metal compound. Moreover, if the molar ratio of the compound represented by the formula 7 to the transition metal compound of the formula 1 is more than 1:1, the amount of the activating agent is relatively low, which causes a problem of not completely performing activation of the transition metal compound of the formula 1, and thus of lowering the activity of the resulting catalyst composition. If the molar ratio is less than 1:25, there is a problem that the compound of the formula 1 is completely activated, but the remaining excessive amount of the activating agent increases the cost of the catalyst composition or the purity of the resulting polymer is lowered.

In the second method for preparing the catalyst composition, the molar ratio of the compound represented by the formula 5 to the transition metal compound of the formula 1 is preferably 1:10 to 1:10,000, more preferably 1:100 to 1:5,000, and most preferably 1:500 to 1:2,000.

If the molar ratio is more than 1:10, the amount of the activating agent is relatively low, which causes a problem of not completely performing activation of the metal compound, and thus of lowering the activity of the resulting catalyst composition. If the molar ratio is less than 1:10,000, there is a problem that the compound of the formula 1 is completely activated, but the remaining excessive amount of the activating agent increases the cost of the catalyst composition or the purity of the resulting polymer is lowered.

Moreover, in the third method for preparing the catalyst composition, the molar ratio of the compound represented by the formula 7 to the transition metal compound of the formula 1 is preferably 1:1 to 1:25, more preferably 1:1 to 1:10, and most preferably 1:2 to 1:5.

If the molar ratio of the compound represented by the formula 7 to the transition metal compound of the formula 1 is more than 1:1, the amount of the activating agent is relatively low, which causes a problem of not completely performing activation of the compound of the formula 1, and thus of lowering the activity of the resulting catalyst composition. If the molar ratio is less than 1:25, there is a problem that the metal compound is completely activated, but the remaining excessive amount of the activating agent increases the cost of the catalyst composition or the purity of the resulting polymer is lowered.

In the preparation of the catalyst composition, as the reaction solvent, a hydrocarbon solvent such as pentane, hexane and heptane, or an aromatic solvent such as benzene and toluene can be used, but not limited thereto. All of the solvents available in the art can be used.

The transition metal compounds of the formula 1 and the cocatalysts can be used as supported on silica or alumina.

The compound represented by the formula 5 is not particularly limited as long as it is alkylaluminoxane, and preferable examples thereof include methylaluminoxane, ethylaluminoxane, isobutylaluminoxane and butylaluminoxane, among which methylaluminoxane is a particularly preferred compound.

The alkyl metal compound represented by the formula 6 is not particularly limited, and preferable examples thereof include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron, among which a particularly preferred compound is selected from trimethylaluminum, triethylaluminum, and triisobutylaluminum.

Examples of the compound represented by the formula 7 include triethylammoniumtetra(phenyl)boron, tributylammoniumtetra(phenyl)boron, trimethylammoniumtetra(phenyl)boron, tripropylammoniumtetra(phenyl)boron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetra(pentafluorophenyl)boron, N,N-diethylaniliniumtetra(phenyl)boron, N,N-diethylaniliniumtetra(phenyl)boron, N,N-diethylaniliniumtetra(pentafluorophenyl)boron, diethylammoniumtetra(pentafluorophenyl)boron, triphenylphosphoniumtetra(phenyl)boron, trimethylphosphoniumtetra(phenyl)boron, triethylammoniumtetra(phenyl)aluminum, tributylammoniumtetra(phenyl)aluminum, trimethylammoniumtetra(phenyl)aluminum, tripropylammoniumtetra(phenyl)aluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetra(pentafluorophenyl)aluminum, N,N-diethylaniliniumtetra(phenyl)aluminum, N,N-diethylaniliniumtetra(phenyl)aluminum, N,N-diethylaniliniumtetra(pentafluorophenyl)aluminum, diethylammoniumtetra(pentafluorophenyl)aluminum, triphenylphosphoniumtetra(phenyl)aluminum, triphenylphosphoniumtetra(phenyl)aluminum, trimethylphosphoniumtetra(phenyl)aluminum, triethylammoniumtetra(phenyl)aluminum, tributylammoniumtetra(phenyl)aluminum, trimethylammoniumtetra(phenyl)boron, tripropylammoniumtetra(phenyl)boron, trimethylammoniumtetra(p-tolyl)boron, tripropylammoniumtetra(p-tolyl)boron, triethylammoniumtetra(o,p-dimethylphenyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetra(pentafluorophenyl)boron, N,N-diethylaniliniumtetra(phenyl)boron, N,N-diethylaniliniumtetra(phenyl)boron, N,N-diethylaniliniumtetra(pentafluorophenyl)boron, diethylammoniumtetra(pentafluorophenyl)boron, triphenylphosphoniumtetra(phenyl)boron, triphenylcarboniumtetra(p-trifluoromethylphenyl)boron, triphenylcarboniumtetra(pentafluorophenyl)boron, trityltetra(pentafluorophenyl)boron, etc.

In the polymerization of a ethylene alpha-olefin copolymer according to the present invention, the catalyst composition can be dissolved or diluted with an aliphatic hydrocarbon solvent having 5 to 12 carbon atoms suitable for an polymerization process, such as pentane, hexane, heptane, nonane, decane, and isomers thereof; an aromatic hydrocarbon solvent such as toluene and benzene; a hydrocarbon solvent substituted with chlorine such as dichloromethane and chlorobenzene, prior to injection. The solvent used herein is preferably used after removing a small amount of water, air, etc. which functions as a catalyst toxin, by treatment with a small amount of alkylaluminum, and a cocatalyst can be additionally used therefor.

Alpha-olefin comonomers copolymerized with ethylene using the above mentioned catalyst composition include diene olefin based monomers and triene olefin based monomers having two or more double bonds. The alpha-olefin comonomer is preferably alpha-olefin having 3 to 20 carbon atoms. Examples of the alpha-olefin comonomer include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene, etc. and Mixtures of the above monomer can also be used. The alpha-olefin comonomer is preferably selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene and 1-eicosene. More preferably selected from the group consisting of propylene, 1-butene, 1-hexene, 4-methyl-1-pentene, and 1-octene. 1-octene is most preferable. At this time, a preferred polymerization solvent is n-hexane.

In the polymerization process of the ethylene-alpha olefin copolymer according to the present invention, a solution process using the catalyst composition is preferable. The catalyst composition can be employed in a slurry or gas phase process, in combination with an inorganic carrier such as silica.

A preferred reactor used in the polymerization process of the ethylene-alpha olefin copolymer is preferably a continuous stirred tank reactor (CSTR) or plug flow reactor (PFR). In the polymerization process of the ethylene-alpha olefin copolymer, two or more reactors are preferably arranged in series or in parallel. In addition, it is preferable that the polymerization process of the ethylene-alpha olefin copolymer further include a separator to continuously separate the solvent and unreacted monomers from the reaction mixture.

The continuous solution polymerization process may consist of a catalyst process, a polymerization process, a solvent separation process, and a recovery process, as follows.

a) Catalyst Process

The catalyst composition used in preparation of copolymers according to the present invention can be dissolved or diluted with an aliphatic or aromatic solvent having 5 to 12 carbon atoms which is substituted or unsubstituted with halogen suitable for an olefin polymerization process, and examples thereof may include an aliphatic hydrocarbon solvent such as pentane, hexane, heptane, nonane, decane, and isomers thereof, an aromatic hydrocarbon solvent such as toluene, xylene and benzene, a hydrocarbon solvent substituted with chlorine atom such as dichloromethane and chlorobenzene, prior to injection. The solvent used herein is preferably used after removing a small amount of water, air or the like which functions as a catalyst toxin, by treatment with a small amount of alkylaluminum, and a cocatalyst can be additionally used therefor.

b) Polymerization Process

In the reactor, the polymerization process proceeds by introducing the catalyst composition containing the transition metal compound of the Formula 1 and a cocatalyst, ethylene monomers, and alpha olefin comonomers. In a solution or slurry phase polymerization, a solvent is injected to the reactor. In the solution polymerization, a mixed solution of the solvent, catalyst composition, monomer and comonomer exists in the reactor.

The molar ratio of ethylene to alpha olefin comonomer is 100:1 to 1:100, preferably 10:1 to 1:10, and most preferably 2:1 to 1:5. If the molar ratio of ethylene is more than 100:1, a density of the produced copolymer is increased. Thus, it is difficult to prepare a low density copolymer. If the molar ratio of alpha olefin is less than 1:100, the amount of unreacted comonomer is increased to reduce the conversion rate, thereby problematically increasing process recycling.

A suitable molar ratio of monomer to solvent for the reaction is a ratio suitable for dissolving the materials before reaction and the produced polymers after reaction. Specifically, the molar ratio of monomer to solvent is 10:1 to 1:10000, preferably 5:1 to 1:100, and most preferably 1:1 to 1:20. If the molar ratio of solvent is more than 10:1, the amount of solvent is very low to increase the viscosity of fluid, thereby causing a problem in transportation of the produced copolymer. If the molar ratio of solvent is less than 1:10000, the amount of solvent is too high, thereby increasing equipment and energy costs due to purification and recycling of solvent.

The solvent is preferably injected at −40 to 150° C. using a heater or freezer, and thus polymerization reaction is initiated with the monomers and the catalyst composition. If the temperature of the solvent is lower than −40° C., although there is a more or less variation depending on the reaction amount, the low temperature of the solvent resulted in the low reaction temperature, which makes the temperature control difficult. If the temperature of the solvent is more than 150° C., the temperature of the solvent is too high to remove heat of reaction.

The pressure is increased to 50 bar or more using a high-capacity pump, and then the materials (solvent, monomer, catalyst composition, etc.) are supplied, thereby passing the mixed material without arrangement of reactor, and additional pumping between a pressure drop device and a separator.

The internal temperature of the reactor, that is, polymerization temperature suitable for the present invention is −15 to 300° C., preferably 50 to 200° C., and most preferably 100 to 200° C. If the internal temperature is less than −15° C., the reaction rate is too low to increase productivity. If the internal temperature is more than 300° C., discoloration may occur, such as impurities and carbonization of copolymer due to side reactions.

The internal pressure of the reactor suitable for the present invention is 1 to 300 bar, preferably 30 to 200 bar, and most preferably 50 to 100 bar. If the internal pressure is less than 1 bar, the reaction rate is decreased to reduce productivity and vaporization of the solvent may be caused. If the internal pressure is more than 300 bar, equipment cost due to high pressure is increased.

The copolymers produced in the reactor are maintained at a concentration of 20 wt % or less in the solvent, and after a short retention time, the copolymers are preferably transported to a first solvent separation process for removal of solvent. The retention time in the reactor of the copolymers according to the present invention is 1 min to 10 hr, preferably 3 min to 1 hr, and most preferably 5 min to 30 min. If the retention time is less than 3 min, production costs are increased due to the short reduction time in productivity and loss of catalyst. If the retention time is more than 1 hr, the reaction proceeds over a suitable activation period of catalyst to increase the reactor size, leading to an increase in equipment cost.

c) Solvent Separation Process

To remove the solvent which is present with copolymers drained out of the reactor, a solvent separation process is performed by changing the temperature and pressure of the solution. For example, the temperature of the polymer solution transported from the reactor is increased to about 200 to 230° C. by a heater, and then its pressure is reduced by a pressure drop device to evaporate unreacted materials and solvent in a first separator.

At this time, the internal pressure of the separator is 1 to 30 bar, preferably 1 to 10 bar, and most preferably 3 to 8 bar. The internal temperature of the separator is 150 to 250° C., preferably 170 to 230° C., and most preferably 180 to 230° C.

If the internal pressure of the separator is less than 1 bar, the content of polymer is increased to cause a problem in transportation. If the internal pressure of the separator is more than 30 bar, the separation of solvent used in the polymerization is difficult. Further, if the internal temperature of the separator is less than 150° C., the viscosity of the copolymer and its mixture is increased to cause a problem in transportation. If the internal temperature of the separator is more than 250° C., discoloration may occur due to carbonization of copolymer by high temperature.

The solvent evaporated in the separator may be recycled from an overhead system to a condensed reactor. After the first solvent separation process, a polymer solution concentrated to 65% may be obtained. The polymer solution is transported to a second separator by a transportation pump through a heater, and the residual solvent is separated in the second separator. While passing through the heater, a thermal stabilizer is injected to prevent polymer deformation due to high temperature. In addition to the thermal stabilizer, a reaction inhibitor is injected into the heater to prevent polymerization due to activity of activated material present in the polymer solution. The residual solvent in the polymer solution injected into the second separator is completely removed by a vacuum pump, and particulate polymers can be obtained through cooling water and a cutter. The solvent evaporated in the second separation process and other unreacted monomers are purified and recycled in a recovery process.

d) Recovery Process

The organic solvent injected with materials during polymerization process may be recycled with the unreacted material in the first solvent separation process, and then also used in the polymerization process. However, the solvent recovered in the second solvent separation process is preferably reused after purification in a recovery process, since it is contaminated with the reaction inhibitor which is mixed for termination of catalyst activity, and contains a large amount of water which functions as a catalyst toxin due to steam supply of vacuum pump.

According to the above described method, the ethylene α-olefin copolymer having a density satisfying Equation: $10^3 \times d \leq -1.8 \times A + 937$ (d is a density of copolymer, and A is a weight percentage of α-olefin in copolymer) may be prepared, and the copolymer has a lower density in the same content of α-olefin comonomer, as compared to known copolymers. In addition, since the ethylene α-olefin copolymer has a $r_1 \times r_2$ value of 1 or less, which is defined by $r_1 = k_{11}/k_{12}$ and $r_2 = k_{22}/k_{21}$, and represents the comonomer distribution, it exhibits a uniform comonomer distribution, wherein the $r_1$ and $r_2$ are monomer reactivity ratios, defined by $r_1 = k_{11}/k_{12}$, $r_2 = k_{22}/k_{21}$, $k_{11}$, and $k_{12}$ is the growth reaction rate constant when monomer 2 is added to a growing chain, of which a terminal active site is monomer 1, and $k_{11}$, $k_{21}$, and $k_{22}$ are also growth reaction rate constants, defined by the same method. The copolymer having a uniform comonomer distribution exhibits a lower melting point and crystallinity in the same comonomer content, thereby exhibiting a lower density, as compared to the copolymer having a random comonomer distribution.

Further, the ethylene α-olefin copolymer prepared by the above method may have a narrow molecular weight distribution (Mw/Mn<3.5), and a density of less than 0.97 g/cc.

MODE FOR INVENTION

Hereinafter, the present invention will be described in more detail with reference to the following Examples. However, these Examples are for the illustrative purpose only, and the invention is not intended to be limited by these Examples.

Synthesis of Ligand and Metal Compound

Preparation Example 1

5-bromo-7-methyl-1,2,3,4-tetrahydroquinoline

A solution of 6-methyl-1,2,3,4-tetrahydroquinoline (1.16 g, 7.90 mmol) in carbon tetrachloride (4 mL) was cooled to −20° C. N-bromosuccinimide (1.41 g, 7.90 mml) solid was slowly added thereto, and the reaction temperature was raised to room temperature, followed by further reaction for 5 hrs. The produced compound was separated by column chromatography using a solvent of MC (methylenechloride) and hexane (1:1) to obtain light yellow oil (0.71 g, 40%).

$^1$H NMR ($C_6D_6$): δ 1.42-1.52 (m, 2H, $CH_2$), 2.00 (s, 3H, $CH_3$), 2.39 (t, J=6.4 Hz, 2H, $CH_2$), 2.75 (dt, J=2.8, 8.4 Hz, 2H, N—$CH_2$), 4.04 (br s, 1H, NH), 6.51 (s, 1H, $C_6H_2$), 7.09 (s, 1H, $C_6H_2$) ppm. $^{13}C\{^1H\}$ NMR($C_6D_6$): δ 20.06, 22.04, 27.60, 41.91, 108.84, 122.59, 126.16, 129.48, 130.67, 139.79 ppm. Anal._Calc. ($C_{10}H_{12}BrN$): C, 53.12; H, 5.35; N, 6.19%. Found: C, 53.30; H, 5.13; N, 6.51%.

Preparation Example 2

5-(3,4-dimethyl-2-cyclopentene-1-on)-7-methyl-1,2,3,4-tetrahydroquinoline

Degassed DME (21 mL) and water (7 mL) were added to 2-(dihydroxyboryl)-3,4-dimethyl-2-cyclopentene-1-on (1.27 g, 8.26 mmol), $Na_2CO_3$ (1.25 g, 11.8 mmol), Pd($PPh_3$)$_4$ (0.182 g, 0.157 mmol), and 5-bromo-7-methyl-1,2,3,4-tetrahydroquinoline (7.87 mmol), and the prepared solution was heated at 95° C. overnight. The reaction solution was cooled to room temperature, and extracted with an ethylacetate solvent (50 mL) twice. The obtained compound was separated by column chromatography using a solvent of hexane and ethyl acetate (2:1) to obtain a light yellow solid (90%).

$^1$H NMR (C$_6$D$_6$): δ 0.77 (d, J=7.2 Hz, 3H, CH$_3$), 1.59-1.70 (m, 2H, CH$_2$CH$_2$CH$_2$), 1.65 (s, 3H, CH$_3$), 1.84 (dd, J=2.4, 18.4 Hz, 1H, OCCH$_2$), 2.21 (s, 3H, CH$_3$), 2.20-2.30 (m, 1H, CH), 2.44 (dd, J=6.4, 18.4 Hz, 1H, OCCH$_2$), 2.60 (br t, J=6 Hz, 2H, CH$_2$), 2.97 (br t, J=5.6 Hz, 2H, N—CH$_2$), 4.06 (s, 1H, NH), 6.66 (s, 1H, CH, C$_6$H$_2$), 6.74 (s, 1H, C$_6$H$_2$) ppm. $^{13}$C{$^1$H} NMR(C$_6$D$_6$): δ 15.83, 19.06, 20.58, 22.51, 27.92, 37.52, 42.48, 43.55 ppm. Anal. Calc. (C$_{17}$H$_{21}$NO): C, 79.96; H, 8.29; N, 5.49%. Found: C, 80.17; H, 8.44; N, 5.75%.

Preparation Example 3

5-(2,3,5-trimethyl-1,3-cyclopentadienyl)-7-methyl-1,2,3,4-tetrahydroquinoline

Anhydrous La(OTf)$_3$ (21.4 mmol) and TFH (24 mL) were cooled to −78° C., and then MeLi (13.4 mL, 21.4 mmol) was added thereto, followed by reaction for 1 hr. 5-(3,4-Dimethyl-2-cyclopentene-1-on)-7-methyl-1,2,3,4-tetrahydroquinoline (7.13 mmol) was added thereto, subjected to reaction at −78° C. for 2 hrs, and extracted using a solvent of water and acetate. The obtained organic layer was shaken with HCl (2 N, 20 mL) for 2 min, neutralized with a NaHCO$_3$ aqueous solution (20 mL), and then dried over MgSO$_4$. the obtained compound was separated by column chromatography using a solvent of hexane and ethyl acetate (10:1) to obtain a light yellow solid (40%).

$^1$H NMR (C$_6$D$_6$): δ 1.66-1.71 (m, 2H, CH$_2$CH$_2$CH$_2$), 1.80 (s, 3H, CH$_3$), 1.89 (s, 3H, CH$_3$), 1.90 (s, 3H, CH$_3$), 2.24 (s, 3H, CH$_3$), 2.64 (br t, J=6.4 Hz, 2H, CH$_2$), 2.74 (d, J=2 Hz, 2H, CH$_2$), 2.86-2.92 (m, 2H, N—CH$_2$), 3.62 (br s, 1H, NH), 6.75 (s, 1H, C$_6$H$_2$), 6.77 (s, 1H, C$_6$H$_2$) ppm. $^{13}$C{$^1$H} NMR (C$_6$D$_6$): δ 11.85, 13.61, 14.39, 20.74, 22.86, 27.70, 42.20, 48.88, 120.81, 122.01, 124.78, 128.68, 129.36, 132.87, 136.36, 136.65, 140.75, 141.15 ppm.

Preparation Example 4 bis(dimethylamido)titanium Compound 5-(2,3,5-Trimethyl-1,3-cyclopentadienyl)-7-methyl-1,2,3,4-tetrahydroquinoline ligand (0.696 mmol) and Ti(NMe$_2$)$_4$ compound (0.156 g, 0.696 mmol) were dissolved in toluene (2 mL), and then the reaction solution was subjected to reaction at 80° C. for 2 days. All solvents were removed to obtain a red solid compound (100%). The titanium compound was characterized by $^1$H-NMR analysis.

$^1$H NMR (C$_6$D$_6$): δ 1.69-1.74 (m, 2H, CH$_2$CH$_2$CH$_2$), 1.86 (s, 3H, CH$_3$), 1.88 (s, 3H, CH$_3$), 1.92 (s, 3H, CH$_3$), 2.31 (s, 3H, CH$_3$), 2.57 (t, J=5.6 Hz, 2H, CH$_2$), 2.95 (s, 6H, NCH$_3$), 3.27 (s, 6H, NCH$_3$), 4.02 (ddd, J=5.2, 7.2, 12.0 Hz, 1H, NCH$_2$), 4.24 (dt, J=5.2, 12.4 Hz, 1H, NCH$_2$), 5.78 (s, 1H, Cp-H), 6.77 (s, 1H, C$_6$H$_2$), 6.91 (s, 1H, C$_6$H$_2$) ppm.

Preparation Example 5

Dichloridetitanium Compound

Toluene (2 mL) was added to the obtained bis(dimethylamido)titanium compound, and then Me$_2$SiCl$_2$ (0.269 g, 2.09 mmol) was added thereto at room temperature. The reaction solution was subjected to reaction for 4 hrs. The obtained compound was recrystallized from hexane at −30° C. to obtain a pure red solid (0.183 g, 66%).

$^1$H NMR (C$_6$D$_6$): δ 1.36-1.44 (m, 2H, CH$_2$CH$_2$CH$_2$), 1.76 (s, 3H, CH$_3$), 1.85 (s, 3H, CH$_3$), 2.07 (s, 3H, CH$_3$), 2.18 (s, 3H, CH$_3$), 2.12 (t, J=4 Hz, 2H, CH$_2$), 4.50-4.70 (m, 2H, N—CH$_2$), 6.02 (s, 1H, Cp-H), 6.59 (s, 1H, C$_6$H$_2$), 6.78 (s, 1H, C$_6$H$_2$) ppm. $^{13}$C{$^1$H} NMR (C$_6$D$_6$): δ 12.76, 14.87, 15.06, 21.14, 22.39, 26.32, 54.18, 117.49, 120.40, 126.98, 129.53, 130.96, 131.05, 133.19, 143.22, 143.60, 160.82 ppm. Anal. Calc. (C$_{18}$H$_{21}$Cl$_2$NTi): C, 58.41; H, 5.72; N, 3.78%. Found: C, 58.19; H, 5.93; N, 3.89%.

Comparative Preparation Example 1 dimethylsilyl(t-butylamido)(tetramethylcyclopentadienyl)titanium dichloride

The titanium metal compound was purchased from Boulder Scientific company (US), and used as received for ethylene copolymerization.

Copolymerization of ethylene and 1-octene

Examples 1-5 and Comparative Examples 1-3

Copolymerization of ethylene and 1-octene by Continuous Solution Polymerization Process A hexane (3.49-5.55 kg/h) solvent, 1-octene (0.45-1.35 kg/h) and ethylene monomer (0.7-0.92 kg/h) were supplied into a 1 L continuous stirred reactor preheated to 100-150° C. at a pressure of 89 bar. The metal compound of Preparation Example 5 or Comparative Preparation Example 1 (0.2-0.8 μmol/min, Al/Ti=25), which was treated with a triisobutylaluminium compound, and an octadecylmethylammonium tetrakis(pentafluorophenyl)borate (1.2-4.8 μmol/min) cocatalyst were supplied from a catalyst storage tank to the reactor to perform copolymerization reaction. The pressure of polymer solution produced by the copolymerization reaction was reduced to 7 bar at the end of the reactor, and then supplied into a solvent separator preheated to 230° C. to remove the solvent by the solvent separation process. The residual solvent was completely removed from the copolymers, which were supplied into a second separator by a pump, using a vacuum pump, and then passed through cooling water and cutter to give particulate polymers. The conditions for polymerization of ethylene and 1-octene copolymer according to the present invention are shown in the following Table 1.

TABLE 1

| | | \multicolumn{7}{c}{Conditions for copolymerization of ethylene and 1-octene} | | | | | | |
|---|---|---|---|---|---|---|---|---|---|
| Example | Catalyst | Solvent feed (kg/hr) | Ethylene feed (kg/hr) | Octane feed (kg/hr) | Feed temp (° C.) | Reactor temp (° C.) | Cat (μmol/min) | B/Ti (molar) | H2 (L/hr) |
| Example 1 | Preparation Example 5 | 3.49 | 0.92 | 1.35 | 23.9 | 151.5 | 0.2 | 6 | 0 |

TABLE 1-continued

Conditions for copolymerization of ethylene and 1-octene

| Example | Catalyst | Solvent feed (kg/hr) | Ethylene feed (kg/hr) | Octane feed (kg/hr) | Feed temp (° C.) | Reactor temp (° C.) | Cat (μmol/min) | B/Ti (molar) | H2 (L/hr) |
|---|---|---|---|---|---|---|---|---|---|
| Example 2 | Preparation Example 5 | 3.74 | 0.92 | 1.13 | 19.7 | 154.1 | 0.2 | 6 | 0 |
| Example 3 | Preparation Example 5 | 3.92 | 0.92 | 0.98 | 26.5 | 155.3 | 0.2 | 6 | 0.95 |
| Example 4 | Preparation Example 5 | 4.17 | 0.92 | 0.75 | 24.4 | 158.3 | 0.2 | 6 | 0 |
| Example 5 | Preparation Example 5 | 4.52 | 0.92 | 0.45 | 17.5 | 161.2 | 0.2 | 6 | 0 |
| Comparative Example 1 | Comparative Preparation Example 1 | 5.55 | 0.7 | 0.60 | 74 | 120 | 0.8 | 6 | 0.54 |
| Comparative Example 2 | Comparative Preparation Example 1 | 5.55 | 0.7 | 0.67 | 74 | 120 | 0.8 | 6 | 0.54 |
| Comparative Example 3 | Comparative Preparation Example 1 | 5.55 | 0.7 | 0.80 | 74 | 120 | 0.8 | 6 | 0.54 |

Evaluation of Physical Properties (Content, Density, Melting Point, and Melt Index of 1-octene)

To evaluate physical properties, ethylene and 1-octene copolymer obtained from CGC catalyst (Dow) were purchased and used as received (Comparative Examples 4-10). The polymers treated with antioxidant (1,000 ppm) were prepared to a sheet having a thickness of 3 mm and a diameter of 2 cm using a press mold at 180° C., and cooled at 10° C./min to measure their density with a Mettler scale. Further, their melt index (MI) was measured according to ASTM D-1238 (condition E, 190° C., 2.16 Kg load).

The melting point ($T_m$) of polymer was determined using a DSC (Differential Scanning Calorimeter 2920) manufactured by TA Instruments. That is, temperature was raised to 200° C., maintained for 5 min, and then decreased to 30° C. Then, temperature was raised again, and a peak temperature on DSC curve was taken as a melting point. At this time, the increase/decrease of temperature was carried out at a rate of 10° C./min, and the melting point was obtained during the second increase of temperature.

The content, density, melting point, and melt index of 1-octene in the copolymer according to the present invention are shown in Table 2.

TABLE 2

Content, density, melting point, and melt index of 1-octene in the copolymer

| Example | Content of 1-Octene (wt %) | Density (g/cc) | DSC Tm (° C.) | MI2.16 (g/10 min) |
|---|---|---|---|---|
| Example 1 | 41.4 | 0.860 | 44 | 2.45 |
| Example 2 | 37.4 | 0.865 | 52 | 1.70 |
| Example 3 | 33.1 | 0.874 | 62 | 5 |
| Example 4 | 28.3 | 0.880 | 70 | 0.3 |
| Example 5 | 20.3 | 0.890 | 87 | not measurable |
| Comparative Example 1 | — | 0.880 | — | 3.50 |
| Comparative Example 2 | — | 0.877 | — | 2.70 |
| Comparative Example 3 | — | 0.872 | — | 2.00 |
| Comparative Example 4 | 42 | 0.863 | 49 | 0.5 |
| Comparative Example 5 | 38 | 0.870 | 60 | 5 |
| Comparative Example 6 | 35 | 0.875 | 67 | 3 |
| Comparative Example 7 | 33 | 0.880 | 72 | 18 |
| Comparative Example 8 | 23 | 0.897 | 94 | 1.6 |
| Comparative Example 9 | 20 | 0.902 | 98 | 3 |
| Comparative Example 10 | 16 | 0.910 | 103 | 3.5 |

As shown in Table 2, the copolymer according to the present invention was found to have a density ranging from 0.86 to 0.89 g/cc according to polymerization conditions. The density of the copolymer depends on polymerization temperature and composition ratio of ethylene/octane. It can be seen that as the polymerization temperature of reactor is low and the composition ratio of octane to ethylene is high, the density of the obtained copolymer is low. It can be also seen that the melt index of copolymer widely ranges from 0.3 to 5 g/10 min, depending on polymerization conditions.

Figure 1:
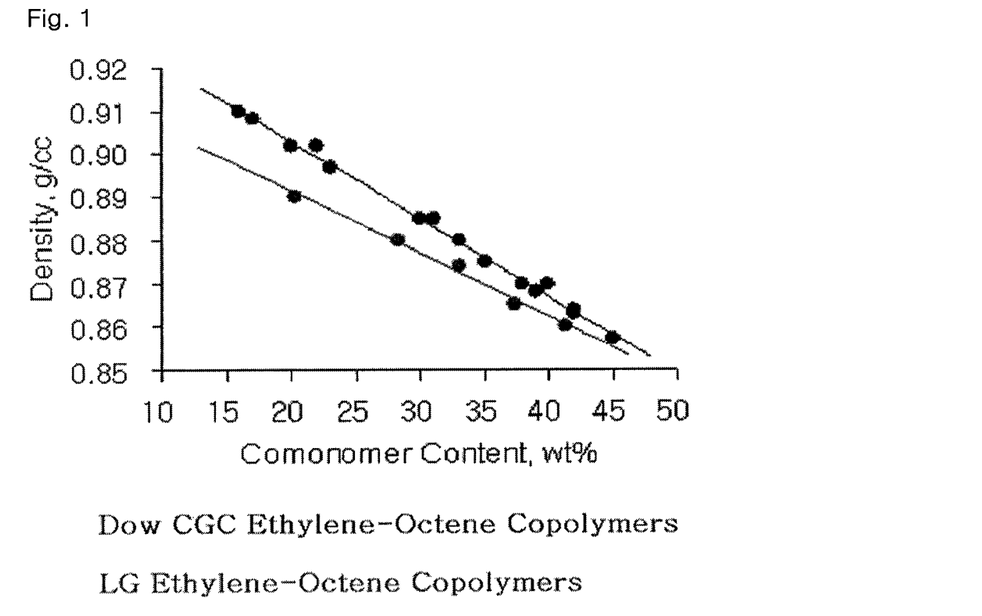
FIG. 1 is a graph showing the density according to the content of 1-octene in ethylene 1-octene copolymer, which is obtained by using the ethylene 1-octene copolymer according to the present invention and CGC (Constrained-Geometry Catalyst) (Dow)
Figure 2:
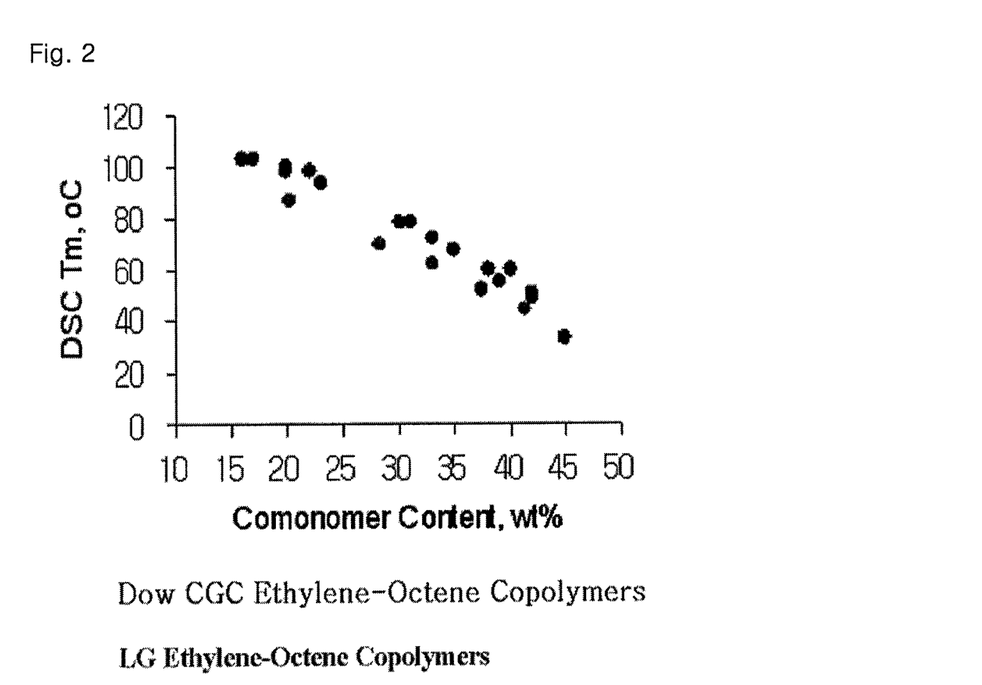
FIG. 2 is a graph showing the melting point according to the content of 1-octene in ethylene 1-octene copolymer, which is obtained by using the ethylene 1-octene copolymer according to the present invention and CGC (Dow).

The density and DSC melting point of the copolymers according to the present invention in Table 2, and copolymer obtained from CGC (Dow) according to the content of 1-octene are illustrated in FIGS. 1 and 2, respectively. As shown in FIG. 1, the copolymer according to the present invention was found to exhibit a lower density and melting point in the same content of comonomer, as compared to the copolymer from Dow, indicating that their difference in physical properties such as density and melting point was due to the different comonomer distribution and crystallinity.

The molecular weight and molecular weight distribution of the copolymer according to the present invention were analyzed using a high temperature GPC system, and the results are shown in the following Table 3.

TABLE 3

Analysis of molecular weight and molecular weight distribution of copolymer using GPC

| Example | Density (g/cc) | Mn | Mw | PDI (Mw/Mn) |
|---|---|---|---|---|
| Example 3 | 0.874 | 31,907 | 85,618 | 2.68 |
| Comparative Example 4 | 0.863 | 51,425 | 133,152 | 2.59 |
| Comparative Example 5 | 0.870 | 29,211 | 72,263 | 2.47 |

As shown in Table 3, the copolymers according to Examples of the present invention were found to have a narrow molecular weight distribution of 3 or less.

The copolymer according to the present invention and the copolymer from Dow were subjected to Triad analysis using C-13 NMR to analyze Ethylene Sequence Distribution and the value of $r_1r_2$. The results are shown in the following Table 4.

TABLE 4

Analysis of Ethylene Sequence Distribution and $r_1r_2$ value of copolymer using C-13 NMR

| Example | Density (g/cc) | CCC | CCE | ECE | CEC | CEE | EEE | $r_1r_2$ |
|---|---|---|---|---|---|---|---|---|
| Example 3 | 0.874 | 0.2 | 1.4 | 10.0 | 0.5 | 15.1 | 72.8 | 0.63 |
| Comparative Example 4 | 0.863 | 0.0 | 4.0 | 10.0 | 2.0 | 18.0 | 66.0 | 1.04 |
| Comparative Example 5 | 0.870 | 0.0 | 3.0 | 9.0 | 1.0 | 17.0 | 70.0 | 1.07 |

In Table 4, E represents ethylene, and C represents alpha-olefin comonomer.

In the general copolymerization of two monomers, as the $r_1r_2$ value is close to 1, the copolymer has a random comonomer distribution. In the case where the $r_1r_2$ value is more than 1, the block copolymer is obtained. As shown in Table 4, since the ethylene-octene copolymer from Dow has the $r_1r_2$ value of 1.04 to 1.07, it has a random comonomer distribution. In contrast, since the ethylene-octene copolymer according to the present invention has the $r_1r_2$ value of 0.63, which is less than 1, it exhibits more uniform comonomer distribution. The copolymer according to the present invention has the uniform comonomer distribution to effectively suppress the crystallization of polymer chain, thereby exhibiting a lower density and melting point in the same content of comonomer, as compared to the copolymer from Dow. Accordingly, the copolymer having the uniform distribution according to the present invention has an advantage that even though introducing a lower content of comonomer, it has the same density as the copolymer from Dow or the conventional ethylene α-olefin copolymers having a random comonomer distribution, and thus it is advantageous in the production cost.

The invention claimed is:

1. A method of preparing an olefin copolymer comprising ethylene and 1-octene, having
   a) a density (d) defined by Equation: $10^3 \times d \leq -1.8 \times A + 937$ (wherein d is a density of copolymer and A is a weight percentage of 1-octene in the copolymer); and
   b) a molecular weight distribution (Mw/Mn) of less than 3.5,
   wherein, the density of the copolymer is 0.86 to 0.89 g/cc, and the olefin copolymer satisfying Equation: $r_1r_2 < 1$ wherein the $r_1$ and $r_2$ are monomer reactivity ratios, defined by $r_1 = k_{11}/k_{12}$, $r_2 = k_{22}/K_{21}$, $k_{12}$ is the growth reaction rate constant when monomer 2 is added to a growing chain, of which a terminal active site is monomer 1, and $k_{11}$, $k_{21}$, and $k_{22}$ are also growth reaction rate constants, defined by the same method,
   wherein the olefin copolymer is prepared by polymerizing ethylene and 1-octene using a catalyst composition containing a transition metal compound of the following Formula 1, and the polymerization is performed at a temperature of 140 to 170° C.:

[Formula 1]

wherein, in formula 1,
R1, R1', R2, R2', R3, R3' and R3" are the same as or different from each other, and are each independently hydrogen; halogen radical; an alkyl having 1 to 20 carbon atoms, aryl or silyl radical; an alkenyl having 2 to 20 carbon atoms, alkylaryl, or arylalkyl radical; a Group 14 metalloid radical substituted with hydrocarbyl; an alkoxy, aryloxy or amino radical, in which two or more thereof are connected to each other by an alkylidene radical containing an alkyl having 1 to 20 carbon atoms or aryl radical to form an aliphatic or aromatic ring,
CY1 is a substituted or unsubstituted aliphatic or aromatic ring, in which CY1 is substituted with hydrogen; a halogen radical; or an alkyl having 1 to 20 carbon atoms or aryl radical, and in the case where CY1 is substituted with the plural substituents, two or more substituents are connected to each other to form an aliphatic or aromatic ring;
M is a Group 4 transition metal; and
Q1 and Q2 are the same as or different from each other, and are each independently a halogen radical; an alkyl amido having 1 to 20 carbon atoms or aryl amido radical; alkyl having 1 to 20 carbon atoms, alkenyl, aryl, alkylaryl or arylalkyl having 1 to 20 carbon atoms; or an alkylidene radical.

2. The method of preparing an olefin copolymer of claim 1, wherein the transition metal compound of Formula 1 is represented by the following Formula 2:

[Formula 2]

wherein R4, R4', R5, R5', and R6 to R14 are the same as or different from each other, and are each independently hydrogen; a halogen radical; an alkyl having 1 to 20 carbon atoms, aryl or silyl radical, an alkenyl having 2 to 20 carbon atoms, alkylaryl, or arylalkyl radical; a Group 14 metalloid radical substituted with hydrocarbyl; or an alkoxy, aryloxy or amino radical, in which two or more thereof are connected to each other by an alkylidene radical containing an alkyl having 1 to 20 carbon atoms or aryl radical to form an aliphatic or aromatic ring, M is a Group 4 transition metal; and Q3 and Q4 are the same as or different from each other, and are each independently a halogen radical; an alkyl amido having 1 to 20 carbon atoms or aryl amido radical; alkyl having 1 to 20 carbon atoms, alkenyl, aryl, alkylaryl or arylalkyl; or an alkylidene radical having 1 to 20 carbon atoms.

3. The method of preparing an olefin copolymer of claim 2, wherein the Formula 2 is represented by the following Formulae 3 or 4:

[Formula 3]

wherein the substituent is the same as defined in Formula 2,

[Formula 4]

wherein R4, R4' and R5' are the same as or different from each other, and are each independently a hydrogen atom or an alkyl having 1 to 20 carbon atoms, aryl or silyl radical;

M is a Group 4 transition metal; and

Q3 and Q4 are the same as or different from each other, and are each independently a halogen radical; an alkyl amido having 1 to 20 carbon atoms or aryl amido radical; an alkyl radical having 1 to 20 carbon atoms.

4. The method of preparing an olefin copolymer of claim 1, wherein the catalyst composition containing the transition metal compound of Formula 1 further comprises one or more cocatalyst compounds of the following Formulae 5 to 7:

$$-[Al(R16)-O]_a-$$

wherein R16 is each independently a halogen radical, a hydrocarbyl radical having 1 to 20 carbon atoms, or a hydrocarbyl radical having 1 to 20 carbon atoms which is substituted with halogen, a is an integer of 2 or more;

$$D(R17)_3 \quad \text{[Formula 6]}$$

wherein D is aluminum or boron, and R17 is each independently a halogen radical, a hydrocarbyl radical having 1 to 20 carbon atoms, or a hydrocarbyl radical having 1 to 20 carbon atoms which is substituted with halogen;

$$[L\text{-}H]^+[ZA_4]^- \text{ or } [L]^+[ZA_4]^- \quad \text{[Formula 7]}$$

wherein L is a neutral Lewis acid; H is a hydrogen atom; Z is an element of Group 13 including B, Al, and Ga; A is each independently an aryl having 6 to 20 carbon atoms or alkyl radical, in which one or more hydrogen atoms are substituted with halogen, a hydrocarbyl having 1 to 20 carbon atoms, alkoxy or phenoxy radical.

5. The method of preparing an olefin copolymer of claim 1, wherein the polymerization is performed by continuous solution polymerization process using the catalyst composition containing the transition metal compound of Formula 1, and ethylene and 1-octene.

6. The method of preparing an olefin copolymer of claim 1, wherein the polymerization is performed in a continuous stirred tank reactor.

* * * * *